United States Patent
Riddell et al.

(10) Patent No.: US 10,198,737 B2
(45) Date of Patent: Feb. 5, 2019

(54) PEER-TO-PEER DATA COLLECTOR AND ANALYZER

(71) Applicant: Parrot Analytics Limited, Auckland (NZ)

(72) Inventors: Christopher Riddell, Auckland (NZ); Jason Hunter, Auckland (NZ); Wared Seger, Auckland (NZ)

(73) Assignee: Parrot Analytics, Ltd. (NZ)

( * ) Notice: Subject to any disclaimer, the term of this patent is extended or adjusted under 35 U.S.C. 154(b) by 683 days.

(21) Appl. No.: 14/662,045

(22) Filed: Mar. 18, 2015

(65) Prior Publication Data
US 2015/0294331 A1 Oct. 15, 2015

Related U.S. Application Data

(60) Provisional application No. 61/955,583, filed on Mar. 19, 2014.

(51) Int. Cl.
G06Q 30/02 (2012.01)
G06Q 50/00 (2012.01)
H04L 29/08 (2006.01)

(52) U.S. Cl.
CPC ......... *G06Q 30/0202* (2013.01); *G06Q 50/01* (2013.01); *H04L 67/104* (2013.01); *H04L 67/22* (2013.01)

(58) Field of Classification Search
USPC ....................................................... 705/7.31
See application file for complete search history.

(56) References Cited

U.S. PATENT DOCUMENTS

| | | | |
|---|---|---|---|
| 7,310,629 B1* | 12/2007 | Mendelson | G06F 17/3002 |
| 2004/0015977 A1* | 1/2004 | Benke | G06F 9/5016 |
| | | | 718/105 |
| 2004/0025669 A1* | 2/2004 | Hughes | G10H 1/0058 |
| | | | 84/609 |
| 2006/0235873 A1* | 10/2006 | Thomas | G06F 17/30867 |
| 2007/0028133 A1* | 2/2007 | Izutsu | H04L 67/104 |
| | | | 714/4.11 |
| 2007/0192349 A1* | 8/2007 | Farr | G06Q 10/00 |

(Continued)

OTHER PUBLICATIONS

Zeilemaker et al. ("Tribler: P2P Media Search and Sharing", MM '11 Proceedings of the 19th ACM international conference on Multimedia, pp. 739-742, Zeilemaker et al., Nov. 28-Dec. 1, 2011).*

*Primary Examiner* — Johnna R Loftis
*Assistant Examiner* — Matthew D Henry
(74) *Attorney, Agent, or Firm* — JRG Attorneys

(57) ABSTRACT

A system for collecting and analyzing metadata from peer-to-peer (P2P) media networks. The present invention gathers metadata about P2P media from the P2P network directly as well as relevant 3rd party social networks where that media is discussed. Users access the system via any Internet enabled device. The users' media streaming behavior is collected so that it can determine what they like. That data is indexed for future analysis. The system also monitors social network dialog keyed to the media (e.g. titles, actors, singers). The system then can identify related media on P2P networks and source it so that it is immediately available. The social data collection agents then extract data about the media that users of social networks are providing for the computing of demand for the media and/or performers.

13 Claims, 5 Drawing Sheets

(56) References Cited

U.S. PATENT DOCUMENTS

| | | | |
|---|---|---|---|
| 2008/0235331 A1* | 9/2008 | Melamed | H04L 67/104 709/204 |
| 2010/0121857 A1* | 5/2010 | Elmore | G06F 17/30702 707/748 |
| 2013/0091117 A1* | 4/2013 | Minh | G06F 17/30864 707/709 |
| 2014/0289862 A1* | 9/2014 | Gorfein | G06F 21/10 726/26 |

* cited by examiner

PEER-TO-PEER DATA COLLECTOR AND ANALYZER

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The present invention relates generally to peer to peer networks, social networks, streaming media, distributed networks, and data analytics.

BACKGROUND OF THE INVENTION

Recent growth in the social network, peer-to-peer (P2P), and streaming media markets has been profound. They are indeed ubiquitous and are becoming mainstream parts of everyday society and most importantly, they are places where people go to get information and entertainment as a primary source. Customers rely on Amazon recommendations to decide what book to read next. They rely on Netflix recommendations to decide what movies to watch. Music lovers rarely listen to the radio because all they could ever want can be streamed to whatever device they happen to be using.

However, as ubiquitous as social networks and streaming media may be, they are only loosely connected. Services that maintain their own integrated social network (e.g. Amazon, Netflix) benefit from their social network alone but not others. Some of these have powerful analytical processing on their closed network of customers/users but their capabilities are severely limited by the closed nature of their proprietary network. Furthermore, for P2P networks, there are very few centralized servers for hosting, analyzing, and delivering metadata about media to users. By its very nature, everything is distributed.

There is far more information floating around the Internet about visual and audio media than could possibly be captured in a single closed network. Even the largest and most successful social networks are not linked to any specific media (e.g. Facebook,). While Facebook, for example, allows users to embed YouTube and other videos into postings, to our knowledge, neither the social network (e.g. Facebook) nor the media source (e.g. YouTube) makes use of that information. Most importantly, a very common topic of discussion on these social networks is media—TV shows that people like, movies they have seen, music they like and want to tell friends about. This is a rich source of untapped information that could be harnessed to assist users in finding media they want and would enjoy, and that could inform media developers and distributors to better know what is wanted, where, and when. The potential for highly granular demand signals is hiding in this data.

What is needed is a system that mines the data associated with P2P networks for activity and semantic associations and then links that to related activity on social networks. The present invention solves this problem by connecting P2P streaming media networks (e.g. BitTorrent) with social media and data analytics. The resulting system provides users with finely granular recommendations and content demand insights based on a combination of key features (such as social sentiment gleaned from the social networks) as well as entertainment domain specific features extracted from P2P networks. It then identifies and sources new media streams (Torrents) based on those recommendations and demand insights. The system further provides highly detailed sentiment information to content developers and distributors for the purposes of tailoring new media production and the distribution of existing media.

SUMMARY OF THE INVENTION

The present invention gathers metadata about P2P media (hereafter referred to as Torrents but not limited to that specific P2P data format) from the P2P network directly as well as relevant social networks where that media might be discussed. Users access the system via any Internet enabled device. The users' media streaming behavior is captured so that it can determine what they like. That data is indexed for future analysis. The system also monitors social network dialog keyed to the media (e.g. titles, actors, singers). The system then can identify related media on the P2P network and source it so that it is immediately available. The social data collection agents then glean data about the media that users of social networks are providing. This allows for the computing of sentiment about the media and/or performers.

The advantages of this approach are that it opens a data channel between P2P networks and social media that has not been open previously such that information from social networks can be used to determine what users like and dislike with greater accuracy. This information is useful to users of the network who receive improved recommendations about other media they would like, but is also useful to media developers and distributors because it yields sentiment information that is temporally and spatially accurate.

DESCRIPTION OF THE INVENTION

This description will begin with a high level architecture that supports P2P data collection and analysis. It will then describe the subsystems for (a) Torrent discovery and detection, (b) social data collection, (c) Torrent indexing and sourcing, and (d) Torrent analysis and reporting.

Figure 1:
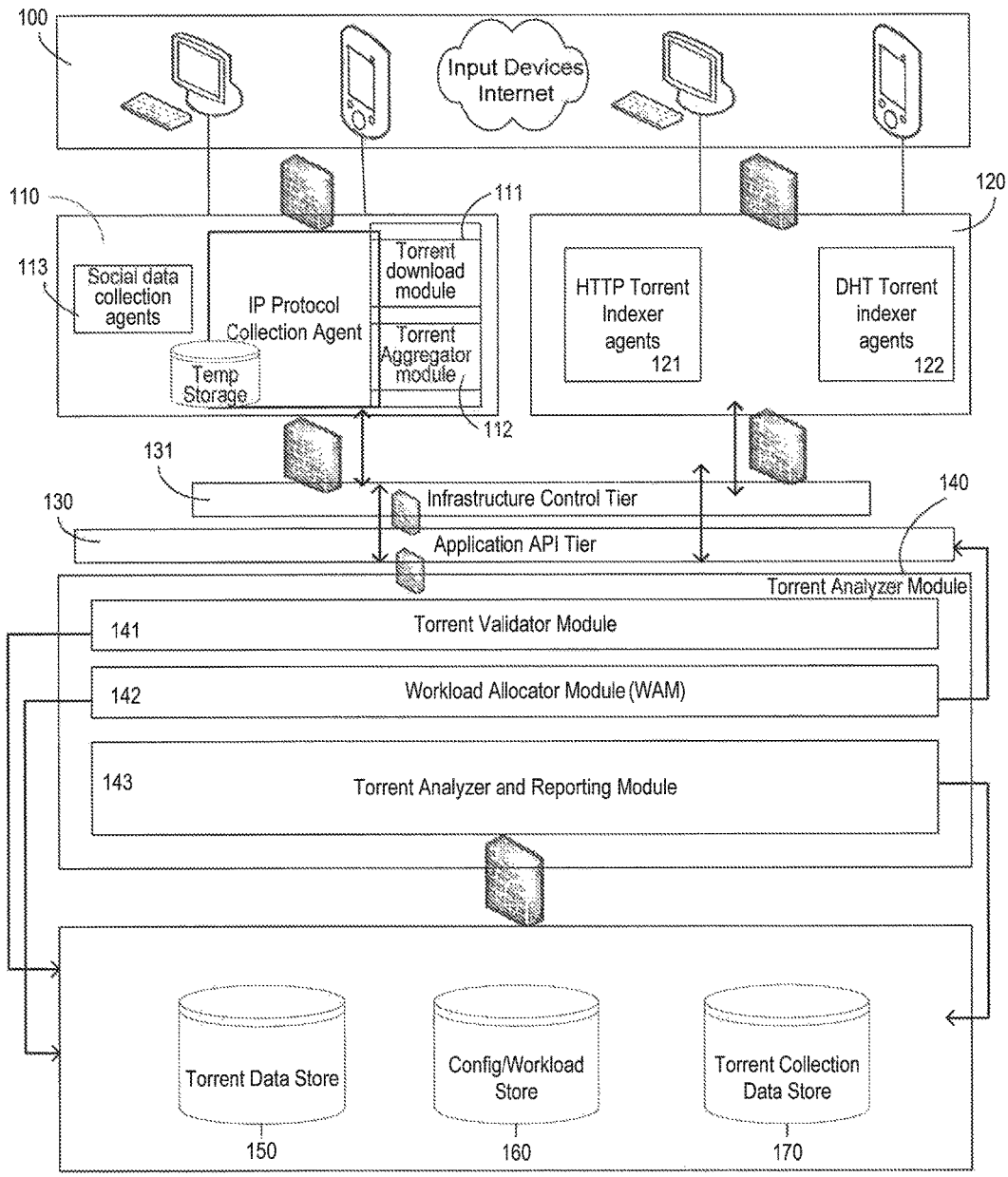
FIG. 1 is an overview schematic diagram of the architecture supporting peer-to-peer data collection and analysis.

[Referring to FIG. 1] Input devices (100) represent a device that could be stationary (Server or Desktop computer) or mobile. Such devices could be a smartphone touch screen device like an iPhone, Windows Phone or Android mobile or even a tablet device or laptop computer. These devices have software installed on them that participate in P2P network communication. Specifically, these devices transmit data in regards to what files they are currently sharing, data about the device and network bandwidth analysis, etc. These devices communicate with the data collection agents (110) by way of exposing a list of titles that they are sharing, as well as device data such as the port number that the P2P software is using and their IP address. The number of devices here can be 1 to millions of devices and are connected to the public Internet.

Data collection agents (110): The data collection agent typically includes a software application that runs on one or more compute instances. The application is responsible for communicating with external clients on an accessible network (i.e., Internet connected) performing handshaking duties with the clients and collecting data about what files they are sharing as well as information about the software they are using (including filename, file size, amount of data shared to date), port number, operating system type and IP address. This is achieved by the Torrent download module which obtains a list of peer IP addresses from other external devices on the Internet, as well as from sourcing similar data which has been obtained from the front end indexer agents (120). The download module (111) handles the low level network communication between itself and external clients and handles the transfer of data between both. The collected data is streamed to the Torrent aggregator module (112) which is responsible for aggregating the incoming data and persisting it to temporary local storage until such time that the data from this temporary storage is then pushed to the main Torrent output data store (170).

A data collection agent typically runs on one compute instance. However, the number of instances can be scaled to any number that is required to meet the demands of the number of external devices.

Front end indexer agents (120): These are broken into 3 main components, each one described below.

HTTP Torrent Indexer Agent (121): This is a module that is part of a wider indexer application which hosts several similar modules. This module is responsible for crawling Torrent indexer (tracker) sites to look for titles across TV shows, film, software, books, and music genres. It does this by crawling through a known list of Torrent sites (that is continually updated by another crawler that identifies suitable Torrent indexer sites) and looking for the top 500 titles across each genre.

In a parallel stream of work, a similar module also applies keyword searches across the same indexer sites to aggressively seek out content that is similar to content being downloaded, manually specified, or that has been provided by way of input from the Torrent analyzer module (140).

DHT (Peer/Node) Torrent Indexer Agent (122): This is a secondary module that forms part of the wider indexer application suite. This is responsible for communication with peers that store data about neighboring peers. Specifically, this module is responsible for communicating with peers that do not directly communicate with any indexer sites. Queries are performed to obtain a list of known titles and IP addresses and port numbers from these peers and stored within its own memory key/value store on a per instance basis. Once validated, the information is persisted into the Torrent data store but saved with a lower weighting value as the information from a peer's DHT (Distributed hash table) reference is far more volatile than data that is obtained from a Torrent tracker site. This method of crawling is performed to ensure as much data is collected as possible from both centralized and decentralized networks.

Similar to the data collection agents, the FE (front end) indexer agents can run on one compute instance, however, the number of instances can be scaled to any number that is required to meet the demands of the number of external clients which are actively being scanned.

Social Data Collection Agents (113): This is an application suite with pluggable modules that allows for data capture from a set of social network sites such as Facebook, Instagram, Tumblr, chat groups and blog sites. Each module contains the required method to "talk" to the social networking endpoint. Each social network component has its own implementation and data that it seeks.

The key output of this application suite is to mine and collect textual descriptions that relate to the P2P content being captured. For instance, in the case of a high peak of demand for an item, such as a TV title like "Agents of S.H.I.E.L.D", this title will be used as an original seed to aggressively find social feedback about this title. Once data has been obtained, it will be stored within the Torrent collection data store. (170) for later analysis. Details on key social modules are described below.

Facebook: A Facebook module is capable of crawling through publicly accessible "fan" pages on the social network site. This is done by referring to an internal Facebook URL stored within the config/workload store (160). Where pages are not "open" and only visible to logged in users, an internal user account is used to participate in the crawling of retrieval (read only) of data from the site for later analysis.

Instagram: An Instagram module is responsible for using the Instagram API by way of public and hashtag streams. Both streams allow for this module to obtain keywords from the config/workload store to search across. The keywords are done individually by way of "#" hashtags and by following users of interest and analyzing their stream of content.

Tumblr: A Tumblr module is responsible for using the Tumblr API to analyze either a content items owned blogging site or by way of analyzing a collection of fan based blog sites which are lined towards a content item by way of public hashtags.

Chat group/Blog sites: The module for this content is a web crawler which inspects a list of known sites that are popular among the categories that we monitor, capture and analyze. Data is scraped from the websites and stored for later retrieval.

Using the example title item (Agents of S.H.I.E.L.D) the module crawls through comments made on the official site on Facebook for a TV title, comparable hash tags and comments made across Instagram and Tumblr fan pages, as well as any free text which has been captured of TV blogging sites that have paragraphs that detail any of the keywords that match the title/keyword(s) in question.

User generated data: This data comes by way of external applications (websites) or mobile applications (native, web, or hybrid) that exposes an interface that allows users to vote or express their thoughts about particular titles.

Specifically, mobile applications that show users what TV shows, books and music titles are trending in their own region. These mobile applications allow users to up/down vote on content that is trending in their area and worldwide (Including the ability to add commentary to titles that are shown to them). These applications learn from users input and provide enhanced recommendations back to them based on previous votes and feedback.

The data that is recorded from this channel is then fed back into the Torrent collection data store (160) for use as additional input into the Torrent analyzer module (140) to decide on which additional titles should be sourced.

The Application API Tier (130) is a programmable interface that the external components communicate with to access internal functions, such as data access (aggregated) and application functions such as security and identity management. To be specific, this API tier can comprise a RESTful interface that is secured by OAUTH and allows external clients such as online portals and mobile clients to interact with further downstream services such as data and app services (recommendations/predictive services).

The Infrastructure Control Tier (131) is a thin interface layer that is responsible for programmatically controlling the network and infrastructure topology. This tier can be called directly, or by way of the application API tier, to orchestrate the processing of scaling up, or down, additional compute instances to handle the processing load of both data collection agents and front end indexer agents.

The Torrent Validator Module (141) performs cleansing and validation services on the titles that are obtained by way of the front end indexer agents. By default, when titles are found, all available artifacts are downloaded from the source, including the Torrent or magnet file, file name and size, source location and any metadata about the file. The validator module inspects the Torrent file to ensure that it is not of zero bytes and is in line with an expected byte size that is typical for these files.

The validator module extracts attributes from the title name to determine the title's friendly name "display name" of the object, and if available, such data as the album name, series number, episode number, author, etc. depending on the type of content item (i.e. music, film, TV episode).

As long as a title is deemed valid (by way of file size and title/genre/title type extraction) this module communicates with an enrichment data source to obtain further details about the content item's title. This step provides further weighting to the accuracy and validation of the title by the simple fact of an external enrichment data source having knowledge on it. Any information that is then gathered is persisted inside the Torrent list data store for later analysis.

The Workload Allocator Module (WAM) (142) is responsible for marshaling availability of resources when required. Conversely, when that load is not required, it is also responsible for reducing the amount of resources to ensure cost efficiencies.

WAM integrates with the API and Infrastructure control tier (130, 131) as well as the config/workload store (160) to ensure that the right amount of compute instances are available across both data collection and index agent tiers. Using infrastructure instrumentation services, WAM instances will poll workload stress on the instances, the last update times of when content items were last searched upon in addition to the number of Torrent titles that are new to the system. It then adjusts the number of resources accordingly to ensure that enough compute instances exist to maintain a steady stream of processing.

The Torrent Analyzer and Reporting Component (143) is responsible for analyzing the type of content items that are being discovered and sourcing additional titles that are of relevance and also for prioritizing content items that need to be sourced and/or data mined. To be specific, the analyzer module inspects a content item's title and based on its features (genre, release data (age), location any known demographic data and global trends for instance) will determine if there are similar items to this type and determine if additional content item sources are needed to be sourced or refreshed.

The prioritization subroutine takes into account the same input data but has a stronger weighting towards current trends and title age to determine what weighting should be given to this and similar content item titles. For instance, if a content item title type is considered popular and deemed important to current and future trend analysis, a high priority figure is assigned to it. This is picked up by the workload allocator module (142) that will then dedicate additional resources to collect further data for these content types.

The reporting module is responsible for enumerating over the disparate datasets that are available and running data through models and algorithms that pertain to item classification and class probability estimation, regression testing, similarity matching, clustering, profiling and link prediction to name a few. The output of these models are persisted in the Torrent Data Store (150) in aggregated form for external client use and monetization.

Discovery and Detection on Peer-to-Peer Networks

Figure 2:
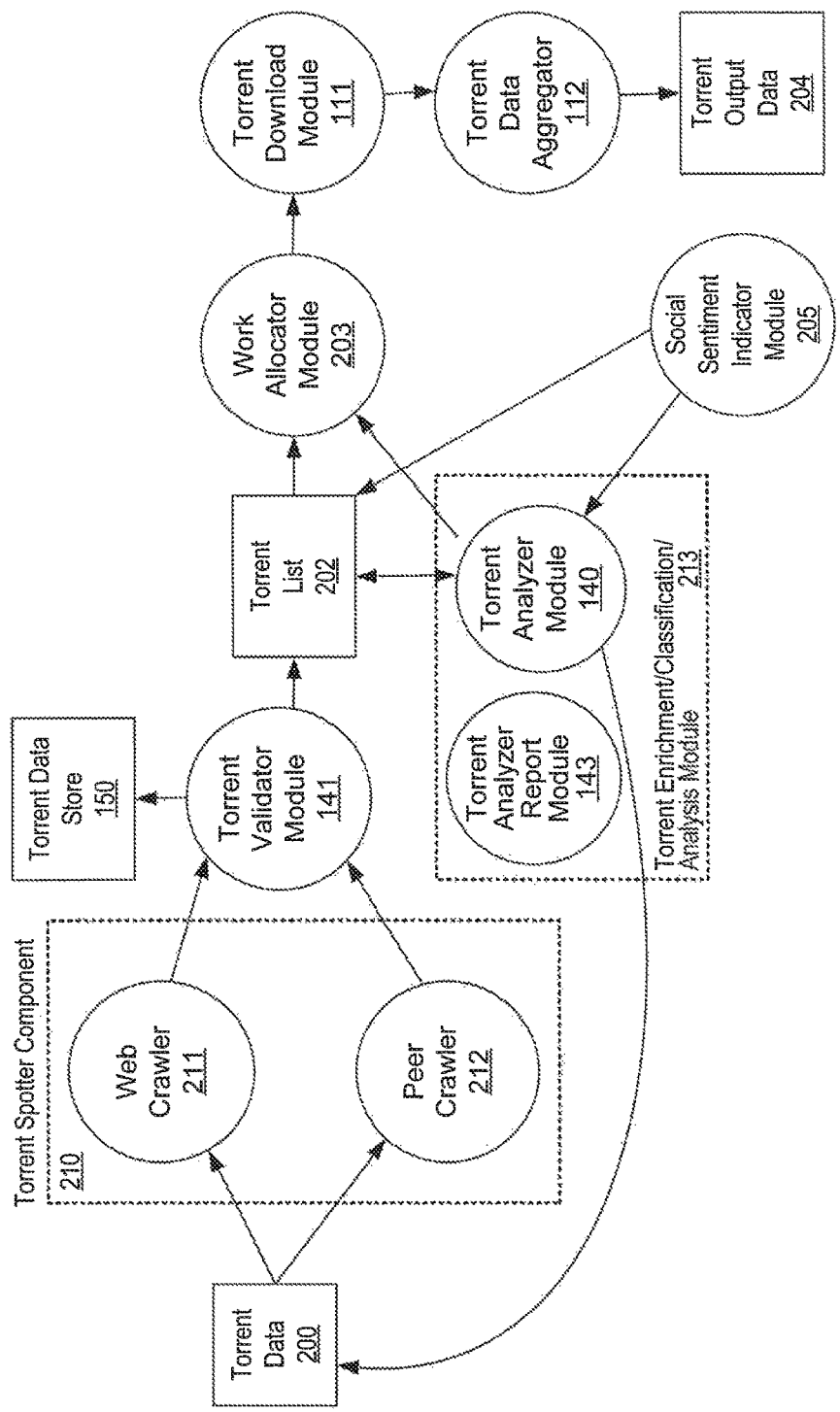
FIG. 2 is a flowchart illustration showing the process for discovery and detection on peer-to-peer networks.

[Referring to FIG. 2] The system that is disclosed here is a mechanism for searching out additional P2P (peer-to-peer) content over a distributed network and automatically sourcing additional items of interest that are in some way related to the content that has been found on the network. For example, the method analyzes and finds an content item that represents a TV title that one or more users are sharing and/or downloading. In this instance, the method determines TV titles of a similar nature and automatically attempts to seek out relevant and similar titles. This process adds one or more titles to a list which is used to determine what items should then be sourced across P2P networks. This forms a looping process that continues to grow the longer it runs.

FIG. 2 represents the process flow and key components that make up this method for content detection and discovery over P2P networks. This statement is agnostic to the type of underlying network infrastructure and applies to all mediums such as cellular JP, and other packet based networks.

The Torrent Data (200) represents a persistent storage mechanism that holds a list of titles that are searched for on a P2P network. This list can be added to manually by a user entering in one or more title names or by way of the system automatically entering in titles as from the output of the Torrent Analyzer Module (140).

A title represents anything from a known entity format, such as a TV series or movie title, the name of a book, software title, or even free text words to search for the item types mentioned. The textual description can be in multiple casing and has no predetermined fixed length on the title name.

The Torrent Spotter Component (210) embodies one or more modules that represent network objects that are capable of understanding the nuances of packet exchange networks (IP based—wireless and fixed) and have the capability to perform an index crawl over known endpoints to seek out items of interest (by way of a Torrent file or magnet link) across P2P networks.

The Web Crawler (211) crawls through public and private P2P index sites of which Torrents that match keywords based on the titles within Torrent Data (200) are sourced and validated (140) to ensure that the Torrent is valid and of interest. If this is the case, the Torrent file is downloaded to the Torrent Data Store (150) and used for later Torrent peer detection in modules 111 and 112.

The Peer Crawler (212) inspects individual peers where the software on a peer (a users host) has its own mechanism for holding a list of known Torrent titles and their network locations. This is normally, but not restricted to, an implementation by way of an in memory distributed hash table. The purpose of this module is the similar to 211 (and this shows the design pattern for the Torrent Spotter Component (210)) which is to source out Torrent locations and files and to pass them to the Torrent Validator Module (141) and to finally persist the Torrent files for downstream processing.

The Torrent Validator Module (141) validates the integrity of the Torrent. For instance, a check is done to ensure that the file is of a real size (e.g. not zero bytes) and that the format of the Torrent file is valid. (Torrent files are a known binary format). If the Torrent file is deemed valid, it is persisted to the Torrent Data Store (150) where it is used for future processing in addition to adding a message payload to the Torrent List (202) repository.

The Work Allocator Module (WAM) (203) prioritizes which P2P assets are sourced and schedules the volume of P2P assets to gather. This data feeds into the Torrent Download Module (111) which runs on one or many thousands of computing nodes and is responsible for network communication between other peers which are within the current peer's P2P network graph.

The Torrent Data Aggregator (112) collects, analyses, and stores the resulting network and Torrent data from each and every peer being scanned. This data is then persisted to a Torrent Output Data (204) store which is then used to perform further analytical processing at a later time for monetization in regards to global content consumption across the content items available within P2P networks. For instance, data stored within the Torrent Data Store (150) is used to show and detail consumer demand for types of TV shows, movies, games and books.

The Social Sentiment Indicator Module (205) is used to seek out data about content item titles stored within the Torrent List (202) and to obtain general comments, related images and overall sentiment to keywords that match the titles that have been analyzed and collected to date. Example related social networks include Facebook, Tumblr and Instagram to name a few. The results of this data are fed back into the Torrent List (202) store for ease of retrieval and downstream processing. In addition, the results from current sentiment trends are fed into the Torrent Analyzer Module (140) as a variable that can affect which additional titles to look out for and seek additional data on.

The Torrent Analyzer Module (140) sources input from the Torrent List (202) which, with the data it has obtained from the Social Sentiment Indicator Module (205), feeds into its processing logic to decide which titles to source. A secondary purpose of this module is to enrich the data it has on the P2P titles to date. This is done by way of sourcing external data and segmenting it with the Torrent List (202) data.

Another key component of the Enrichment/Classification and Analysis Component (213) (Comprising modules 143 and 140) is the Torrent Analyzer Report Module (143). This module is further broken up into subcomponents that are responsible for analyzing the Torrent data in real time streaming and batch processes.

On data ingestion, data models are run over the data to provide real-time insights into the continuous stream of data that is received. In addition to this is an offline component that deals with batch processing execution of data across longer periods. The output of this process is a list of additional titles and keywords that are relevant to the titles that the system has knowledge of, in addition to what is being sourced in real time, which is then persisted into Torrent Data (200) with a high priority so the Torrent Spotter Component (210) can allocate time to its internal modules to seek out Torrent files.

Social Data Collection

Figure 3:
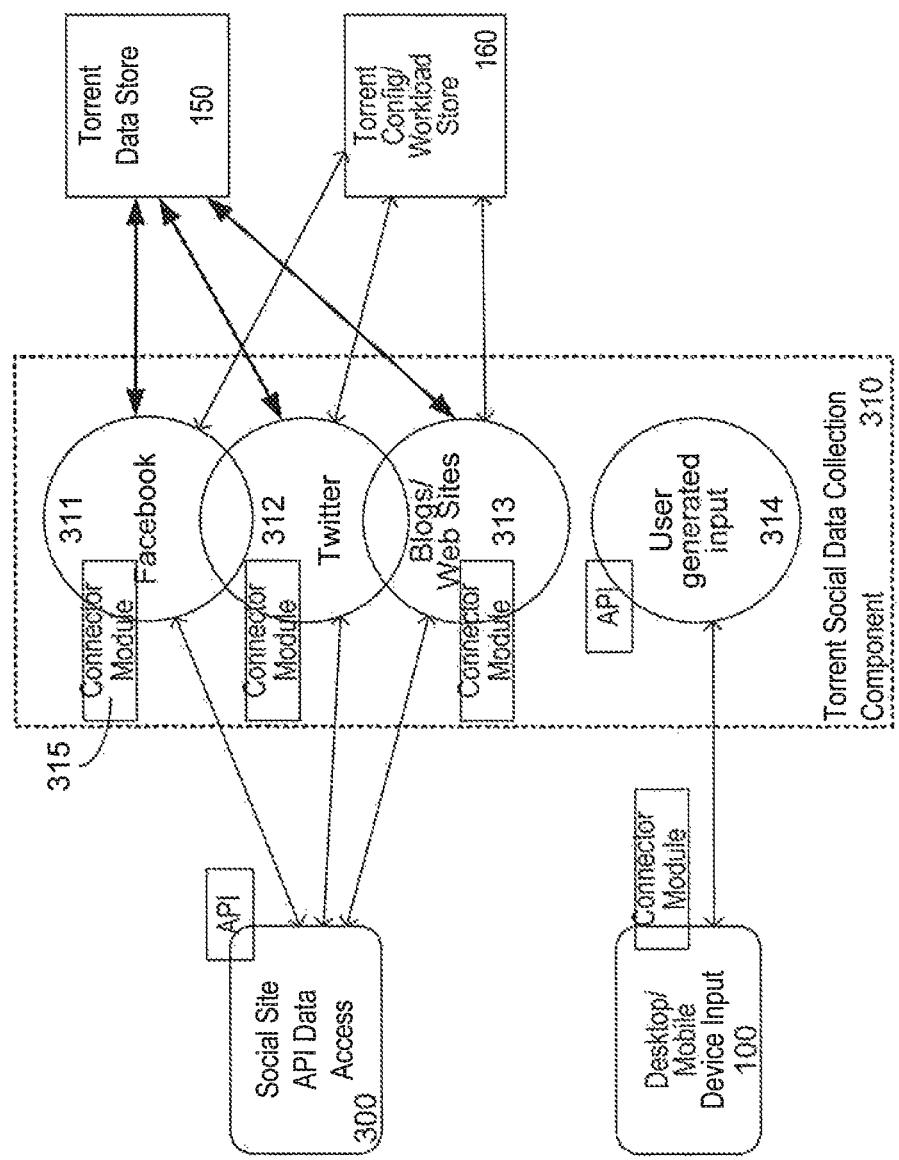
FIG. 3 is a flowchart illustration showing the process for social data collection associated with the media from the peer-to-peer network.

[Referring to FIG. 3] The process which is disclosed here is a method for ascertaining general sentiment values towards items that are being tracked and analyzed on P2P networks. To be specific, when a title is found on P2P networks, this method will source out textual data across a collection of known social networking sites to obtain relevant text about the title.

In addition to this polling approach, the data collection component also involves external clients (Desktop/Mobile devices (100)) where users can provide input, ratings and textual feedback about titles that are exposed. This user generated data is augmented with the additional social data collected from external sites. All Social network and user generated data is then stored within the Torrent store system (150) for downstream analysis.

The Torrent Social Data Collection component (310) is an application suite that consists of a collection of software modules that each pertain to an individual social network channel. An example of the method and approach used to obtain this data is listed below.

Facebook Module (311). This module makes a call to the Torrent config database (160) to retrieve credential information for authentication and authorization services. Other data retrieved will be hostnames, URLs and any other metadata information that needs to be provided for inter-site communication.

The Facebook module works in two modes. One is around known pages that pertain to a list of interested titles. An example of this could be a fan page for a TV title, movie or music artist. In this case a list of posts and the text are captured and stored for further analysis. No personally identifiable information is stored. This mode runs under the context of a Facebook user or application token.

The second mode utilizes a public crawl approach where a search upon public hashtags on Facebook is obtained. This is done by making a call to the Facebook social graph specifying a specific hashtag value. This hashtag is typically in relation to a title of a Torrent and/or a piece of metadata that relates to a title. For example, hashtag calls are made against the words "breaking bad", "Vince Gilligan", "Walter White" to obtain comments in relation to these topics. This data is then stored within the Torrent Data Store (150) for downstream analysis. For example, by use of a map reduce implementation, such as Hadoop.

The Connector Module (315) is responsible for brokering communication between the module implementation and the social network endpoint handling such details as authentication/authorization and network communication.

Instagram Module (312): This module makes a call to the Torrent config database (160) to retrieve credential information for authentication and authorization services. Other data retrieved will be hostnames, URLs, @userids and a list of hashtags to follow.

The Instagram module is responsible for making calls to the Instagram API by way of the public and user streams which are available. The Instagram module constantly polls against the data (user streams and hashtags) to obtain a list of images and comments that are made available. This data is then stored within the Torrent Data Store (150) for downstream analysis.

The Connector Module (315) is responsible for brokering communication between the module implementation and the social network endpoint handling such details as authentication/authorization and network communication.

Blogs/Websites (313): This module makes a call to the Torrent config database (160) to retrieve credential information for authentication and authorization services, where applicable. The Website Crawler module (211) exists to perform web indexing and crawling on websites that are based on the forum/Hog type format as well as general purpose websites that are identified as containing industry related information for the TV, film, and music industries.

There could be many instances of this module to crawl through a known list of sites (which is grown automatically and manually) to obtain a list of textual content that contains one or more keywords that pertain to Torrent titles that we have captured to date. This module cleans up the text by stripping out any HTTP markup and other formats (XML, additional formatting markup) and then persists the data to the Torrent Data Store (150) for downstream analysis.

The Connector Module (315) is responsible for brokering communication between the module implementation and the social network endpoint handling such details as authentication/authorization and network communication.

User Generated Input (UGI) (314): This module consists of an external HTTP accessible endpoint that external clients can interact with. Typically these comprise of mobile devices but can extend to desktop web based clients.

The UGI endpoint exposes a RESTful based endpoint that allows for applications to pass in user input based on a title object. For instance, a mobile device application that will display a list of titles that are trending within a user's region. The mobile user can then select a title and provide, for example, the following feedback.

Thumbs up

Thumbs down

A numerical rating (between 1-10) on how much they like the title

Text based comment against the title

A title in this case typically refers to a TV title and/or genre, music title or album, movie title or ebook title.

From here, the UGI module sanitizes and prepares the data (ensuring it contains no personally identifiable data, unless the user opts in) to persist the results to the Torrent Data Store (150) for downstream analysis.

The Connector Module (315) is responsible for brokering communication between the module implementation and the social network endpoint handling such details as authentication/authorization and network communication.

Torrent Indexing and Sourcing

Figure 4:
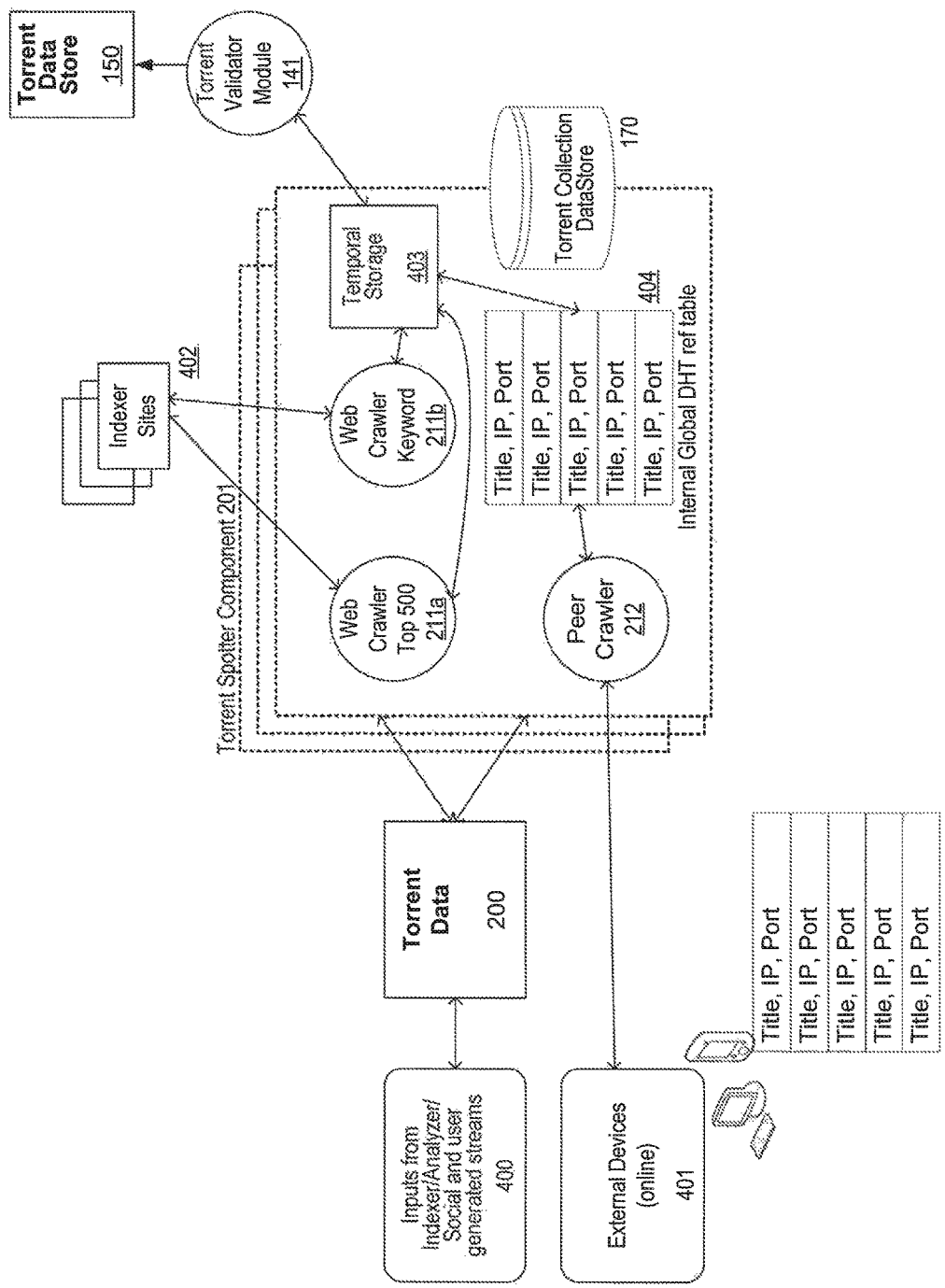
FIG. 4 is a flowchart showing the process for Torrent indexing and sourcing.

[Referring to FIG. 4] The process disclosed describes a method for sourcing Torrent titles from a range of locations that include centralized indexer sites as well as decentralized locations such as by way of individual online peers.

At a high level, the web crawler modules (211*a*, 211*b*, 212) are responsible for sourcing Torrent titles of interest from both public and private indexer sites. This is done by way of sourcing a rolling top 500 list of Torrent titles from a list of indexer sites around the world as well as using individual search terms (keywords) that have been produced by the Torrent Analyzer Module (140). The Peer Crawlers (212) are responsible for communication with a known set of online peers and using established protocols to query surrounding peers that contain Torrent files to source additional content.

Web Crawler Module (keyword) (211*b*): An input into the indexer agents is the Torrent Data Store (150) which is populated by way of manual updates or by electronic means such as data from the Torrent Analyzer module (140). This module polls through this data store to obtain a random list of Torrent titles. The random weighted list is a subroutine that is shared among all web crawler instances that inherit from the same base type. This list will detail the following attributes:

| Name | Description |
| --- | --- |
| Title/Keyword | Friendly name (i.e., Breaking Bad) |
| Genre | Comedy, Drama |
| Added Time | Date of addition (Used for internal auditing and instrumentation) |

The module then communicates to the torrent Configuration Store (160) to obtain a list of known Torrent indexer sites to perform its web indexing from. As this is a keyword search, the web crawler keyword module (WCKM) (211*b*) then uses the keywords to perform a search across the Torrent sites.

A list of Torrent items is then captured and persisted into its local temporal storage (403) as a buffer before sending on to the Torrent Validation Module (141) for validation and cleansing.

Web Crawler Module (top 500) (211*a*): This purpose of this module is to obtain the top 500 Torrents (the number of top Torrents is variable) from each category (TV, film, movie, animation, books, software) etc., from a known list of public and private Torrent indexer sites. Depending on the site, it uses the appropriate communication mechanism (screen scrape, RSS feed, API call, etc.) to obtain this data, which it stores inside its local temporal storage (403) before sending on to the Torrent Validation Module (141) for validation and cleansing.

As Torrent data is obtained, it is stored in a volatile storage system which could be an in memory cache or by way of a file system that is not persistent. At a timed interval (e.g. every 10 minutes) the data is flushed and fed to the Torrent Validator Module (141) for analyses and to be persisted to permanent storage.

Peer Crawler Module (P2P Node Interrogator) (212): The Peer Crawler Module does not rely on Torrent index sites and is purposely built to handle data mining from existing peers on the network. With some P2P software applications moving to a more decentralized architecture where data about other items and peers is shared among the peers themselves, an additional approach is required to obtain this data.

This is achieved by going through a list of recent known peers and acting in a similar fashion as a P2P client application. It then utilizes known protocols to communicate with these peers (after establishing a handshake to determine the protocol type and version similar to how modems communicate to establish common connection protocols) to then query a list of known Torrent titles and neighboring peer addresses.

This data is stored within an in memory DHT (distributed hash table) where a collection of Torrent titles, IP addresses, software type and port numbers are held (404). This data is then stored within a Torrent Collection Data store (170) which is used by the Torrent Validator Module (141) to determine the relevance and integrity of the data. This data is marked as such so the Work Allocator Module (142) can prioritize its workload efficiently.

Torrent Analysis and Reporting

Figure 5:
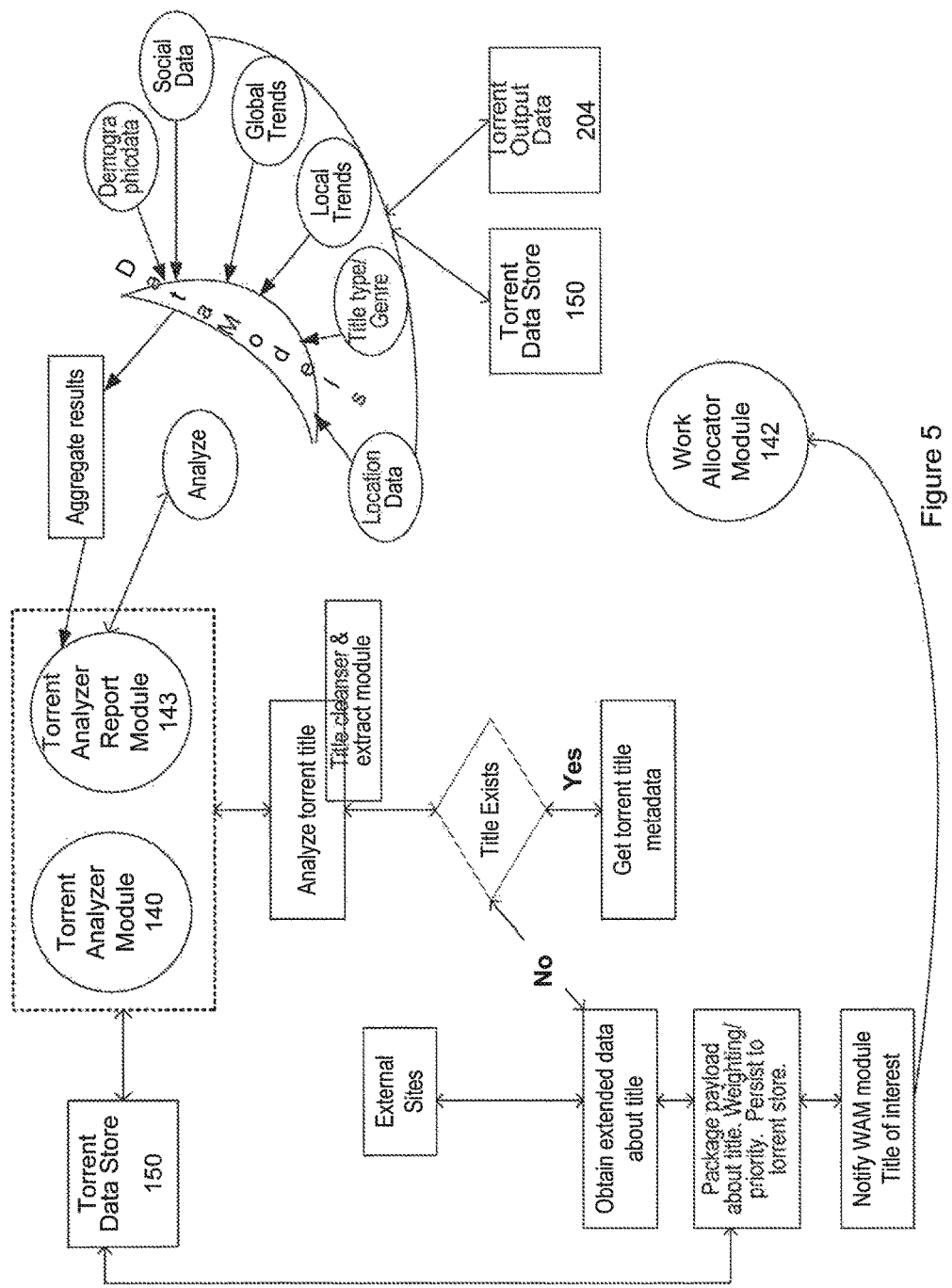
FIG. 5 is a flowchart showing the process for Torrent analysis and reporting.

[Referring to FIG. 5] The process disclosed describes a method for determining what additional Torrent titles should be obtained from P2P networks based on current data collection metrics. It also details the enrichment process, which involves gathering additional metadata about each content item title which is not typically available from P2P networks, as well as the process of applying analytic models over the P2P data that has been gathered to date.

Torrent Analyzer Module (140): The Torrent Analyzer Module (TAM) (140) is responsible for keeping track of new and existing content item titles in addition to the number of Torrent files that relate to an individual Torrent title. The analyzer module handles each content item title differently by applying different subroutines depending on the type (new or existing).

TAM is designed to be independent so multiple instances of the software can be run in parallel. As each instance executes, it picks up a number of titles [100] and for each title, performs a check to verify if additional metadata needs to be obtained for it. Or, if the data is stale (older than a week) the metadata is refreshed.

Content item cleansing tasks are performed on new content item titles to strip out irrelevant metadata and characters from the title. For existing content item, this task would already have been performed so a "friendly" name can be obtained directly from the metadata and searches can be done on it. If a title does not exist, a subroutine is responsible for connecting to external partner sites to obtain a list of additional Torrent titles that match the current content item title by name as well as ones which are similar to the current title by genre.

These titles will be persisted into the Torrent Data Store (150) and marked accordingly with the following attributes.
Is the title new/existing?
Do Torrent files need to be fetched for it?
A list of similar titles that have context and relevance to the titles, type and genre where type can be TV, film, song, book, game, software.

These updates are processed by the Torrent Spotter component (201) which is responsible for the actual sourcing of Torrent tiles and files. A push notification is sent to the WAM module (142) to indicate that items of interest (new titles) have been recorded.

Torrent Analyzer Report Module (TARM) (143): This module is a suite of technologies and subsystems that are responsible for mining the data which has been captured to date (including Torrent metadata as well as peer download data) and running them through algorithms to produce data models for further analysis.

The TARM module is responsible for augmenting data from the Torrent Data Store (150) and the Torrent Output Data (204) and running them through a number of Parrot Analytics proprietary algorithms in regards to classification, regression and predictive analytics. The resulting output is then stored back inside the Torrent Data Store (150) to be made available for external client access through the API tier.

INDUSTRIAL APPLICATION

The invention applies to users and providers participating in social and P2P networks. The APIs that expose the sourced Torrents and metadata can be monetized for third party applications that may specialize in a specific genre or type of media. The data itself can be monetized for developers and distributors of media because it yields far superior sentiment results that are temporally and geographically accurate. This data does not exist today in any form.

What is claimed is:

1. A system for correlating topical, temporal, and geo-specific entertainment data about torrent media titles on peer-to-peer and social networks, the system comprising:
a persistent data store for storing entertainment data about torrent media titles;
a torrent indexer coupled to the persistent data store for collecting torrent metadata about torrent media titles from media repositories and for storing said torrent metadata in the persistent data store, said torrent indexer having a peer-to-peer indexer site interface for accessing data from a peer-to-peer indexer site, a crawling indexer for continuously searching peer-to-peer indexer sites via the peer-to-peer indexer site interface for sharing data about torrent media titles on a peer-to-peer network, a keyword indexer for searching peer-to-peer indexer sites via the peer-to-peer indexer site interface for data about torrent media titles specific to a given keyword, and a peer crawler for searching peers not connected to the indexer sites for data about torrent media titles shared on the peer-to-peer network;
a peer-to-peer data collection agent host coupled to the persistent data store for collecting peer-to-peer client data about sharing activity of torrent media titles from peer-to-peer clients and for storing said peer-to-peer client data in the persistent data store;
a social data collection agent host coupled to the persistent data store for collecting social data from social networks based on the torrent metadata stored in the persistent data store, and for storing said social data in the persistent data store;
a data enrichment agent coupled to the persistent data store for cleaning and enriching the collected peer-to-peer client data, the collected social data, and the torrent metadata, and for storing said cleaned and enriched data in the persistent data store;
a torrent correlator coupled to the persistent data store for correlating the cleaned and enriched data generated by the data enrichment agent based on torrent media titles, access dates, media types, and geo-location indicators of the peer-to-peer client data source, the torrent metadata source, and the social data source;
a torrent analyzer and discoverer for identifying similar torrent media titles to a torrent media title in the persistent data store based on common torrent metadata and peer-to-peer client data indicating a new torrent media title;
a demand analyzer coupled to the persistent data store for analyzing demand for a torrent media title in the persistent data store based on the correlated data generated by the torrent correlator to determine what torrent media is in demand, when it is in demand, and where it is in demand; and
an updating agent for updating the demand for every torrent media title in the persistent data store to maintain temporal currency of all torrent media titles in the persistent data store.

2. The system of claim 1 wherein the social data collection agent host includes:
a social network interface for communicating with external social networks;
a local configuration store for storing credentials and access information for each external social network; and
a crawler for querying and receiving information similar to the enriched and cleaned data in the persistent data store on external social networks.

3. The system of claim 2 wherein the crawler includes:
a chat group and blog interface and search system for collecting similar data about torrent media titles from known fan sites; and a user-generated data interface for collecting similar data about torrent titles from Internet and mobile applications that collect specific user responses from users.

4. The system of claim 3 wherein user responses include:
voting (selecting from a list);
binary voting (thumbs up or thumbs down); and
commentary (free input).

5. The system of claim 1 wherein the sharing data includes:
torrent media title;
torrent media file size; and
torrent media file sharing activity.

6. The system of claim 1 wherein the data about torrent media files includes:
a list of known torrent titles; and
IP addresses and port numbers of the peers.

7. The system of claim 1 wherein the torrent analyzer includes:
a validator for ensuring that a torrent media title is of valid form and size; and
an extractor for extracting further data about the torrent media title from the peer-to-peer network.

8. The system of claim 7 wherein the data about the torrent media title includes:
the torrent media title's display name title;
the series number;
the episode number;
the author;
the genre;
the subgenre;
the producer;
the distributor; and
the studio.

9. The system of claim 1 that includes an Application Programming Interface (API) that exposes the persistent data store as a service to $3^{rd}$ parties.

10. The system of claim 1 that includes a workload allocator for managing computing resources as required by computing demands on the system.

11. The system of claim 1 including wherein the data collection agent includes a client interface for communicating with external peer-to-peer networks.

12. A method for correlating topical, temporal, and geo-specific entertainment data about torrent titles on peer-to-peer and social networks, the steps comprising:

accessing data from a peer-to-peer indexer site and continuously searching said peer-to-peer indexer site via a crawling indexer for sharing data about torrent media titles on the peer-to-peer network and searching for data about torrent media titles specific to a given keyword via a keyword indexer;

searching peers not connected to the peer-to-peer indexer site for data about torrent media titles shared on the peer-to-peer network via a peer crawler;

aggregating said peer-to-peer client data and storing it in a persistent data store;

collecting torrent metadata about torrent media titles from media repositories including peer-to-peer search repositories and storing said metadata in the persistent data store;

collecting social data from social networks by searching for terms found in the torrent metadata and the peer-to-peer client data in the persistent data store;

cleaning and enriching the collected peer-to-peer client data, the collected social data, and the torrent metadata via a data enrichment agent and storing said cleaned and enriched data in the persistent data store;

correlating the cleaned and enriched data from the peer-to-peer client data, the torrent metadata, and the social data based on torrent media titles, access dates, media types, and geo-location indicators of the peer-to-peer client data source, the torrent metadata source, and the social data source via a torrent correlator;

discovering similar torrent media titles to those in the persistent data store based on common torrent metadata and peer-to-peer client data indicating a new torrent media title via a torrent analyzer and discoverer;

analyzing demand for a torrent media title in the persistent data store based on the correlated peer-to-peer client data, torrent metadata, and social data to determine what torrent media is in demand, when it is in demand, and where it is in demand via a demand analyzer; and updating demand for every torrent media title in the persistent data store to maintain temporal currency of all torrent media titles in the persistent data store.

13. The method of claim 12 further including the steps:
storing demand for every torrent media title in the persistent data store to the persistent data store; and
exposing the persistent data store as a 3rd party service via an Application Programming Interface (API).

* * * * *